US008656285B1

(12) United States Patent
Alessandrini et al.

(10) Patent No.: US 8,656,285 B1
(45) Date of Patent: Feb. 18, 2014

(54) WEB-BASED SYSTEM AND METHOD FACILITATING PROVIDER-USER INTERACTION AND THE RELEASING OF DIGITAL CONTENT

(75) Inventors: Michele Alessandrini, Bologna (IT); Guglielmo Ubaldi, Bologna (IT)

(73) Assignee: Michele Alessandrini, Bologna (IT)

( * ) Notice: Subject to any disclaimer, the term of this patent is extended or adjusted under 35 U.S.C. 154(b) by 259 days.

(21) Appl. No.: 12/856,868

(22) Filed: Aug. 16, 2010

(51) Int. Cl.
*G06F 15/177* (2006.01)
*G06F 3/00* (2006.01)

(52) U.S. Cl.
USPC ........... 715/738; 715/735; 715/736; 715/740; 715/743; 715/748; 715/749; 715/760

(58) Field of Classification Search
USPC .......... 715/735, 736, 740, 743, 748, 749, 760
See application file for complete search history.

(56) References Cited

U.S. PATENT DOCUMENTS

| | | | |
|---|---|---|---|
| 7,117,254 B2 * | 10/2006 | Lunt et al. ...................... | 709/218 |
| 7,398,557 B2 * | 7/2008 | de Jong ........................... | 726/29 |
| 8,230,348 B2 * | 7/2012 | Peters et al. ................... | 715/738 |
| 8,230,361 B2 * | 7/2012 | Goldberg et al. ............. | 715/815 |
| 8,359,477 B2 * | 1/2013 | Gatto et al. .................... | 713/189 |
| 8,478,758 B2 * | 7/2013 | Jeavons ......................... | 707/738 |
| 8,491,391 B2 * | 7/2013 | Brunet de Courssou et al. .............................. | 463/40 |
| 8,521,817 B2 * | 8/2013 | Ryan et al. ..................... | 709/204 |
| 8,522,147 B2 * | 8/2013 | Bladel et al. .................. | 715/739 |
| 8,538,065 B2 * | 9/2013 | Bladel et al. .................. | 382/100 |
| 8,538,810 B2 * | 9/2013 | Fox ............................. | 705/14.49 |
| 8,538,895 B2 * | 9/2013 | Appelman et al. ............ | 705/319 |
| 8,539,359 B2 * | 9/2013 | Rapaport et al. .............. | 715/751 |
| 8,560,706 B2 * | 10/2013 | Appelman ..................... | 709/227 |
| 8,572,167 B2 * | 10/2013 | Tiu et al. ....................... | 709/203 |
| 8,572,221 B2 * | 10/2013 | Galbreath et al. ............ | 709/223 |
| 8,583,563 B1 * | 11/2013 | Bonilla et al. ................ | 705/319 |
| 2003/0233462 A1 * | 12/2003 | Chien ........................... | 709/229 |
| 2004/0148275 A1 * | 7/2004 | Achlioptas ....................... | 707/3 |
| 2005/0266835 A1 | 12/2005 | Agrawal et al. | |
| 2006/0230061 A1 | 10/2006 | Sample et al. | |
| 2007/0156594 A1 | 7/2007 | McGucken | |
| 2007/0255965 A1 | 11/2007 | McGucken | |
| 2008/0288499 A1 | 11/2008 | Choi et al. | |
| 2008/0320079 A1 | 12/2008 | Da Palma et al. | |
| 2009/0132403 A1 | 5/2009 | Titus et al. | |
| 2009/0156181 A1 * | 6/2009 | Athsani et al. ............ | 455/414.2 |
| 2009/0287764 A1 * | 11/2009 | Pazhyannur et al. ......... | 709/203 |
| 2010/0063873 A1 | 3/2010 | McGucken | |
| 2012/0291066 A1 * | 11/2012 | Lourdeaux ..................... | 725/34 |

* cited by examiner

*Primary Examiner* — David Phantana Angkool
(74) *Attorney, Agent, or Firm* — Waddey Patterson; Gary L. Montle

(57) ABSTRACT

A web based platform and method is provided for facilitating content transactions between a provider and one or more users. Content transmitted from a content provider via a communications network and a customized graphical user interface, and stored on a database server in association with content data. Access to an identifier of the content is provided for users of the user interface, and value is received from one or more users in association with the content. In response to the received value, selective access to the content by one or more users is provided, with the access for a particular user determined based on the content data. The content data in various embodiments may include a value threshold for the content, with access provided to all users or a set of users after a cumulative value received exceeds the value threshold.

20 Claims, 15 Drawing Sheets

WEB-BASED SYSTEM AND METHOD FACILITATING PROVIDER-USER INTERACTION AND THE RELEASING OF DIGITAL CONTENT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: None

BACKGROUND OF THE INVENTION

The present invention relates generally to web-based platforms and methods for facilitating content transactions between content providers and online users. More particularly, the present invention relates to a web site that facilitates interaction between content providers and potential users of the content, wherein content may be made collectively accessible upon the collection of value from users in excess of a predetermined threshold.

The current business model for digital content in general, and more particularly in the field of music, remains largely as it has existed for generations. Artists produce and release music. Then, the new releases go through as many sales channels as possible in order to reach the marketplace. The more contemporary "digital" sales channels such as for example iTunes, eMusic, CDBaby, etc., have added new means for reaching potential buyers but have not significantly changed the basic model.

On the other hand, what have changed are the behaviors of the final consumers of the music. Their approach has changed with time and technology. Peer-to-peer ("P2P") platforms are generally regarded by many in the music community with skepticism or worse, either as a direct threat by facilitating file sharing and therefore "piracy," or indirectly as an uncontrollable variable that disperses creative content solely for the benefit of the end users and without adequately compensating the artist, creator, owner, producer, etc. In a broader context, however, "sharing" may more pragmatically be seen as a paradigm for the ways in which users of the Internet interact with each other, whether to share a video, a song, a link or simply a thought of any kind no matter how small, and is not an activity particularly confined to the world of music.

Current attempts to incorporate the online music community into a business model involve simply providing qualitative music for the community to listen to, download and share for free, wherein the artists are likely to end up with more people who recognize their work. However, this type of promotion in and of itself fails to bring in revenue to compensate the artist. Further, the artist frequently does not receive significant benefit from the sales of CD's or MP3's which may follow such a promotion, given the costs of production and inequitable distributions of profits.

BRIEF SUMMARY OF THE INVENTION

Various embodiments are described herein for systems and methods of generating value for artists or other creators of digital content based on a web community of users. The present disclosure relates to sustainable business models based on the empathy between the creators and consumers of digital content, and generally reflects current societal behaviors and methods of accessing content rather than imposing behaviors and methods upon users.

In an embodiment of the present disclosure, a computer implemented method is provided for facilitating content transactions between a content provider and online users. Content is received at a database server as transmitted from a content provider via a communications network and a customized graphical user interface. The content is stored on the database server in association with content data. Access is provided to an identifier of the content by users of the user interface. Value is received from one or more of the users in association with the content. In response to the received value, selective access to the content by one or more users is provided, with access for a particular user determined based on the content data.

In another embodiment, a processor-readable storage medium is provided having instructions residing thereon, with the instructions executable by one or more processors to cause the one or more processors to perform various steps of the present invention. Content is received at a database server as transmitted from a content provider via a communications network and a customized graphical user interface. The content is stored on the database server in association with content data. Access is provided to an identifier of the content by users of the user interface. Value is received from one or more of the users in association with the content. In response to the received value, selective access to the content by one or more users is provided, with access for a particular user determined based on the content data.

In another embodiment, a computer implemented method is provided for selectively providing access to online content via a customised graphical user interface. Value is received from one or more contributing users in association with the content. Access is then provided to the content for a user based on one or more of value received from the user, a cumulative value received from the one or more contributing users, and a predetermined value threshold provided by the content provider in association with the content.

DETAILED DESCRIPTION OF THE INVENTION

Figure 1:
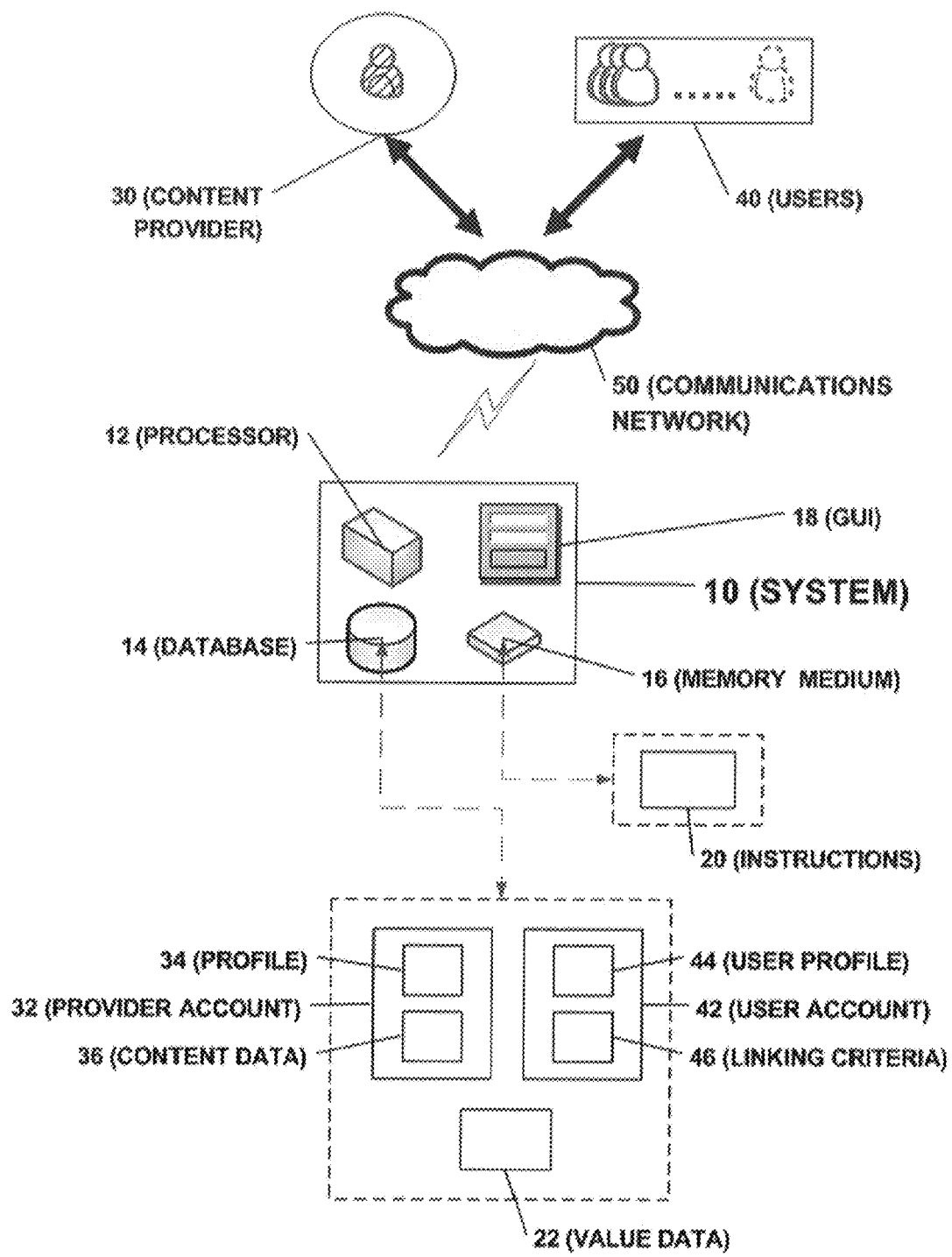
FIG. 1 is a block diagram showing an example of a computer system upon which an embodiment of the present disclosure may be implemented.

Where the various figures may describe embodiments sharing various common elements and features with other embodiments, similar elements and features are given the same reference numerals and redundant description thereof may be omitted below.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Terms such as "providing," "processing," "supplying," "determining," "calculating" or the like may refer at least to an action of a computer system, computer program, data processor, logic or alternative analog or digital electronic device that may be transformative of data represented as physical quantities, whether automatically or manually initiated.

In various embodiments of the present invention, computer-based systems and methods for facilitating content transactions between a content provider and one or more content users may be described herein, further with reference to the attached figures. In an embodiment such as shown in FIG. 1, a computer system 10 may be provided which includes a processor 12, a database 14, a computer-readable memory medium 16, and a customized graphical user interface 18. The system 10 may via the user interface 18 interact directly or indirectly with the content provider 30 and/or content users 40 across a communications network 50.

The user interface 18 may generally be in the form of a web-based platform hosted by the computer system 10 and integrating various users and content providers in social networking aspects as may be familiar to those of skill in the art. The user interface 18 may in certain embodiments be configured for interfacing with a particular type of user communications device such as for example a desktop computer, a portable computer or a mobile communications device such as for example a smart phone, or may alternatively include various interface configurations such that the user interface 18 takes on an appropriate configuration according to whichever type of user communications device is being implemented at a given time.

While the system 10 as shown may imply the various components being provided with respect to a single computing platform or server, it may be understood by one of skill in the art that various combinations of components may be distributed across a number of platforms and functionally linked or otherwise linkable within an operating sequence to perform the steps or otherwise implement the subject matter of the present invention.

A "content provider" 30 may generally be referred to as a source or "uploader" of content with respect to the system 10, and a final authority with regards to levels and conditions of user access to the content, and in an ownership capacity a collector of value provided from users with respect to the content, whether or not the content provider is in fact the author, creator or inventor of the content. "Content users" 40 or simply "users" 40 may refer herein to any prospective users or "downloaders" of content with respect to the system 10, or in other words any visitor to the system who has access or seeks access to content stored in the system. "Access" as used herein may relate generally to the ability of a user to interact with, manipulate, view and/or otherwise obtain the subject matter of the digital content in question, including without limitation downloading content from the user interface via the communications network, reading or listening to content directly via the user interface, streaming or linking content indirectly from the user interface via the communications network, and any other equivalent accessing means as may be understood by those of skill in the art as being within the scope of the present disclosure.

The term "computer-readable memory medium" 16 as used herein may refer to any medium alone or as one of a plurality of memory media having processor-executable software, instructions or program modules which upon execution may provide data or otherwise cause the computer system to implement subject matter or otherwise operate in a specific manner as further defined herein. It may further be understood that more than one type of memory media may be used in combination to conduct processor-executable software, instructions or program modules from a first memory medium upon which the software, instructions or program modules initially reside to the processor for execution.

"Memory media" 16 may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor-executable software, instructions or program modules residing on the media to be read and executed by a processor, including without limitation wire, cable, fiber-optic and wireless media such as is known in the art.

The term "processor" 12 as used herein may refer to at least general-purpose or specific-purpose processing devices and/or logic as may be understood by one of skill in the art, including but not limited to central processors, parent processors, graphical processors, media processors, and the like.

The term "communications network" 50 as used herein with respect to data communication between two or more parties or otherwise between communications network interfaces associated with two or more parties may refer to any one of, or a combination of any two or more of, a global network such as the Internet, local networks, network links, Internet Service Providers (ISP's), and intermediate communication interfaces.

Referring now generally to FIGS. 1 and 2*a* to 2*c*, an embodiment of a method of operation 100 with regards to the present disclosure may be described in detail. It may be understood that the steps of the method 100 are not necessarily presented in a rigid chronological order or even that each of the steps are required in a particular embodiment of the present invention or in a particular use of a given embodiment, but rather that the steps as described herein may generally illustrate an exemplary use of the present invention and various steps and features associated therewith.

The method 100 begins (in step 101) by receiving content data 36 which is transmitted by a content provider 30 via the communications network 50 and the graphical user interface 18. Examples of content data 36 which may be received include without limitation one or more of digital content, a content identifier, a content access type, a value threshold, and in certain embodiments as further described below a particular web page for content display.

It may be understood that not all of the content data is necessarily transmitted to the system 10 via the communications network, and that some or all of the content data may be manually entered or selected by the content provider from a list of subject matter provided by the user interface. In an exemplary embodiment, while digital content such as for example a song or collection of songs may be uploaded to the system 10 by the content provider, the digital identifier may be a title of the song or collection of songs, or an equivalent of the same, that is entered or typed by the content provider in a pop-up box generated by the system 10, as opposed to for example an image that is uploaded in conjunction with the digital content itself. The content access type may further be selectable from among a plurality of content access types provided by the system 10 in a pull-down menu or pop-up box or the equivalent as may be generated within the user interface 18. Likewise, the value threshold may be entered or typed by the content provider in a pop-up box generated by the system 10 within the user interface 18.

In various embodiments the system 10 may include a separate step of requiring the content provider to indicate that the uploaded or otherwise provided digital content was in fact authored, created, or invented by the content provider, or to further or otherwise indicate that any relevant intellectual property associated with the digital content is owned by the content provider. The required indication may take on various forms depending on the context, and generally as known to those in the art.

Examples of selectable content access types in an embodiment of the present invention may include a standard access type, a free access type and one or more hybrid access types (including without limitation a "premium unlocked" access type, and/or other partial access, selective access, time-based access, etc.), examples of which may be described further below. In certain embodiments it may be anticipated however that only one content access type may be provided or otherwise permitted by the system, in which case there would obviously be no "selectable" content type options.

The content provider may in a particular session upload digital content to the system 10, or alternatively may merely provide supplemental content data with respect to digital content having previously been provided by the content provider.

After receiving content data from the content provider, the content data 36 may be stored in a database 14 in association with a content provider account 32, or alternatively for example a content-specific account or an equivalent identifier, such that the content data 36 may be saved and subsequently recovered as desired or required by the system 10 (step 102). The content identifier in various embodiments may be stored in association with a content provider profile 34 generated by the system, such as for example a "home" web page associated with the content provider 30.

In an initial state for the content data, the system 10 may provide access to the content identifier via the user interface 18 to prospective users 40 of the content (step 103). For example, a user 40 may enter a web site associated with the system and view a displayed identifier for the digital content, which in certain embodiments may be further associated with additional content data such as a brief description, a content status symbol or identifier wherein the user may determine whether the content is currently available, the cumulative value received to date with respect to the content (as described further below), the value threshold (if any, also described further below), etc.

Figure 3:
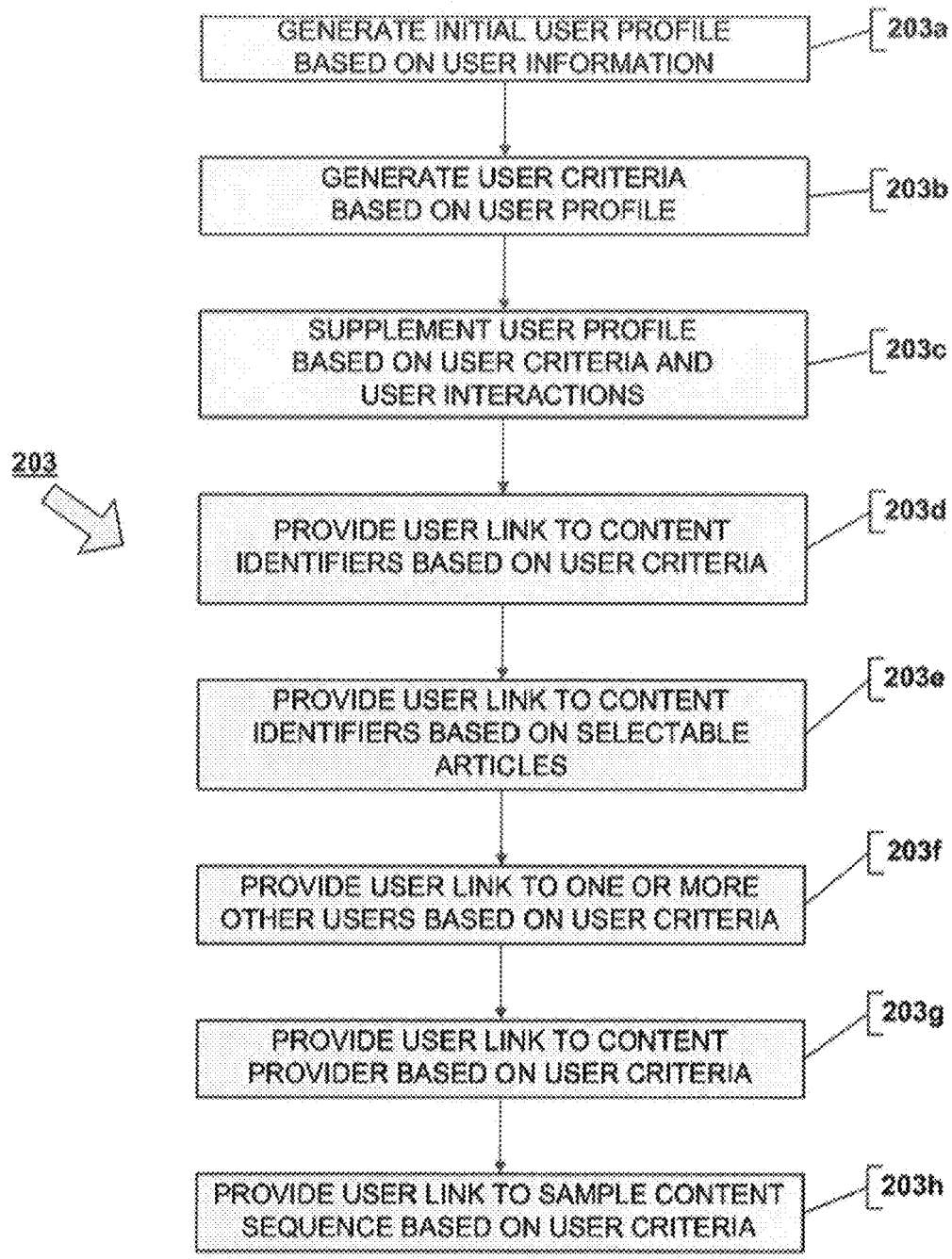
FIG. 3 is a flowchart showing another example of a method for facilitating interaction according to an embodiment of the present disclosure.

Access may be provided by the system 10 to content identifiers for users in a general web page provided for that purpose, or may be provided with respect to a web page selected by the content provider or determined by the system to be appropriate in light of the subject matter, for example including but not limited to the content provider profile 34 or content provider home page 34. Various embodiments of the method 100 may incorporate sub-steps to step 103 as shown in FIG. 3 and further described below, such that interaction between content providers and users of the system is even further and more efficiently facilitated.

For any particular example of digital content provided for access by visitors or otherwise users of the system 10, the digital content may as described above be associated with a content type as selected by the content provider. In step 104, the system 10 may determine whether or not a particular example of digital content is designated as a "free" content type or an equivalent thereof, such as for example "unlocked," "unrestricted," etc.

If the particular example of digital content has in fact been designated as free content by the content provider (e.g., "yes" as a response to the query in block 104), in step 105 the system generally provides unrestricted access to the particular digital content for users of the system. In other words, for digital content designated as "free" by the content provider, the system does not apply any security or equivalent barriers to access of the stored digital content by visitors to the web site or other structural embodiment of the user interface. A user may therefore locate the provided content identifier and select the digital content for downloading without distinction as to the source of the user request or selection.

If the particular example of digital content has not been designated as free content by the content provider (e.g., "no" as a response to the query in block 104), but has instead been affirmatively designated as any of one or more alternative content types, it may generally be stated that access to the digital content for a particular user is restricted, particularly in the context of a first user seeking access to the digital content having such a designation. The restriction in various embodiments of the present invention may be dependent on whether or not a cumulative value received from users in association with the digital content is sufficient in light of the content data further associated with the digital content. For example, in the particular case where digital content may have been designated by the content provider as either of a "standard" content type or a "hybrid" content type, the cumulative value received from users may be compared to a value threshold selected by the content provider to determine whether the cumulative received value is sufficient to "unlock" the content for at least partial access by users of the system.

In step 106, the method 100 continues by receiving value from one or more users in association with digital content that is thus far inaccessible. "Value" as used herein may generally relate to tangible monetary value, but may in various alternative embodiments and without limitation further relate to examples of intangible or non-monetary value, such as for example a number of user email addresses, phone numbers or any other equivalent subscriber information as may be designated by the content provider with respect to the associated value threshold for the digital content. In various embodiments the system may generate and store value data 22 in the database 14 corresponding to the cumulative value received with respect to a particular example of digital content and further corresponding to or otherwise cross-referencing the users from which the value is received.

In step 107, the method continues by comparing the cumulative value received from one or more users with respect to a particular example of digital content to the value threshold for the digital content.

If the cumulative value received is equal to or greater than the value threshold (e.g., "yes" as a response to the query in block 107), the method continues to step 111 as described further below.

If the cumulative value received is less than the value threshold (e.g., "no" as a response to the query in block 107), the digital content remains inaccessible to users of the system pending either or both of additional value being received by users of the system and further action by the content provider. The method may in various embodiments continue by checking to see if such further action has been provided by the content provider, first (in step 108) by determining if the content provider has "unlocked" the digital content for at least some users, or in other words the system determines if the content provider has accessed the system and revised the content data such that the cumulative value received is now sufficient. This may be done by for example reducing the value threshold to a value less than or equal to the cumulative value received to date, or by revising the content type, or in various embodiments the system may provide a selectable option for the content provider to simply freeze value collection at a current level and provide at least partial access to the digital content at that time. If the content provider has in fact "unlocked" the digital content in any of the above manners or an equivalent thereof (e.g., "yes" in response to the query of block 108), the method continues with step 111 as described further below.

If the content provider has not manually "unlocked" the content (e.g., "no" in response to the query of block 108), the method in step 109 may determine if the content provider has withdrawn the digital content from the value collection process and thereby withdrawn the digital content from potential access by users of the system. In various embodiments the system may provide the content provider with one or more selectable options to withdraw the content from value collection and/or withdraw the content identifier from user access, even where the content remains stored in the system database, or to delete the content from the system entirely.

If the content provider has withdrawn the content (e.g., "yes" in response to the query in block 109), the method may continue in step 110 by returning any collected value to date to each of the one or more users that have contributed the associated value. In various embodiments this may take on any number of forms as would be known to one of skill in the art, including without limitation an automatic direct electronic transfer of funds to a provided remote account associated with the user, storing of the funds in an account within the system and associated with the user, delivering an electronic communication to the user informing of the situation and the availability of the funds for electronic transfer, etc.

If the content provider has neither of "unlocked" the content nor "withdrawn" the content prior to the next user request or submission of value (e.g., "no" in response to the query in block 109), the method returns to step 106 and receives the next submitted value from a user.

Where the content provider has "unlocked" digital content (e.g., "yes" in response to the query in block 108) or the cumulative value received is determined by the system to be sufficient based on the content data from the content provider (e.g., "yes" in response to the query in block 107), the method may proceed to provide at least partial access to the content for users based on the content type. In step 111, the method determines whether the content has been designated by the content provider as a "standard" content type or alternatively a "hybrid" content type. It may be understood that the names of the content types as given herein are merely exemplary and content types may be provided within the scope of the present invention having different titles but similar features, or alternatively even having various different features that are equivalent to or anticipated within the scope of the present invention.

Where the content has been designated as a "standard" content type, the method may continue in step 112 by providing access to the digital content for all users in substantially the same manner as if the content had been designated as "free" content. In various embodiments the system may simply in step 112 automatically revise the content type from "standard," or in other words locked or restricted to all users when the cumulative received value is less than a value threshold, to "free," or in other words unlocked or unrestricted to all users. The method then may continue to step 114 by providing the collected value associated with the digital content to the content provider. In various embodiments this may take on any number of forms as would be known to one of skill in the art, including without limitation an automatic direct electronic transfer of funds to a provided remote account associated with the content provider, storing of the funds in an account within the system and associated with the content provider, delivering an electronic communication to the content provider informing of the situation and the availability of the funds for electronic transfer, etc.

Where the content has been designated as a "hybrid" content type, the method may continue in step 113 by providing access to the digital content for a predetermined set of users. In an embodiment the predetermined set of users may include only those users that have contributed value associated with the digital content, such that the content will be released to those users but remain inaccessible or "locked" to all other users. In various embodiments this may take on the form of providing a plurality of security levels and applying a first security level to a user with respect to digital content for which value has been contributed by the user, and applying a second security level to the user with respect to digital content for which value has not been contributed, and repeating the process for all other users of the system.

Alternatively, the system may in certain embodiments provide more than one type of "hybrid" content types, wherein for example the system packages security levels such that contributing to a first example of digital content may permit the user to access the first digital content and also other examples of digital content within the package. In a particular embodiment, a content provider may provide a plurality of examples of digital works and select a "hybrid" content type for each, wherein a user contributing to any one or more of the digital works may receive access to each of the digital works that subsequently become "unlocked" when the cumulative received value associated with the work exceeds the threshold associated with the given work.

The method then may continue to step 114 by providing the collected value associated with the digital content to the content provider. In various embodiments this may take on any number of forms as would be known to one of skill in the art, including without limitation an automatic direct electronic transfer of funds to a provided remote account associated with the content provider, storing of the funds in an account within the system and associated with the content provider, delivering an electronic communication to the content provider informing of the situation and the availability of the funds for electronic transfer, etc.

Referring now to FIG. 3, in various embodiments user access to content identifiers may be determined and provided in accordance with a method 203 having one or more substeps to step 103 of the method 100 in FIG. 2. It may be understood that the method 203 of FIG. 3 may apply independently of the method 100 as shown in FIG. 2, that not all of the steps shown in FIG. 3 may be necessary or applicable in a given embodiment, that the steps shown in FIG. 3 are not intended to imply a particular or necessary chronological order, and further that not all of the steps shown in FIG. 3 may be particularly applicable for a given application where for example certain of the steps have already been performed and are only intended for an initial user configuration.

In step 203a the system 10 may generate a user account 42 including an initial user profile 44 based on information provided by the user, or in other words a first time visitor to the web site or visitor to the web site who has never before registered or otherwise provided information sufficient to generate a user profile. The user account 42 may generally be stored in the database 14 or otherwise in a data storage repository 14 functionally linked to the system such that the user profile 44 may be accessible. The user profile 44 may in various embodiments include a user "home" page which may be further accessed by other users 40.

In step 203b the system 10 may then generate user linking criteria 46 based on the initial user profile 44. The linking criteria 46 may take on various forms including, for example and without limitation, geographic information, demographic information, general content preferences, general content rejections, etc.

In step 203c, the system 10 may monitor user interaction with the various web pages and associated content of the system and supplement the user profile 44 and user criteria 46 over time based on the monitored user interaction. In certain embodiments the system may further provide "cookies" which are downloaded by the user in a manner well known to those of skill in the art, and may serve to further identify user behavior and supplement the user criteria over time.

In step 203d, the system 10 may then link the user 40 to content identifiers based on the user linking criteria 46 during any one or more subsequent visits to the user interface platform 18 or web site 18 by the user (such visits also referred to herein as online sessions). For example, where the system has identified a particular content identifier as being associated with digital content of a form or in a genre that has further been identified as a general content preference by the user, the user may be provided with a selectable link offering access to for example a web page or pop-up box containing the content identifier. The system may further for example identify digital content which has been determined by the system to be within the scope of the user criteria based on observed user behavior.

In step 203e the system 10 may link the user 40 to content identifiers based on references to the associated content in materials such as articles selected by the user from within the user interface. As an example, the user may select an article for viewing, or a web page containing the article, and where a particular example of digital content is cited in the article the system may provide a link in a section of the web page offering access to for example a web page or pop-up box containing the content identifier.

In step 203f the system 10 may link the user 40 to one or more other users 40 based on the user linking criteria 46. In certain embodiments the system may merely provide selectable links in a section of whichever web page the user happens to be currently viewing, offering access to for example the home pages 44 for any one or more users that have previously been selected by the user for are otherwise associated with a group that has previously been selected by the user for collaboration, discourse, sharing, etc. In various embodiments the system may alternatively or in addition provide selectable links to one or more users that may be of interest to the user based for example on the user criteria and the criteria associated with the one or more other users.

In step 203g the system 10 may link the user 40 to a content provider 30 or for example a home page 34 for the content provider 30 based on the user criteria 46, wherein the one or more content identifiers associated with the content provider may be accessed by the user.

In step 203h, the system 10 may link the user 40 to a sample content sequence based on the user criteria 46. For example, the system may provide a selectable link in a section of the home page for the user or whichever web page the user is currently visiting, which upon user selection generates a sequence of sample content based on the user criteria. Where the content form in question is music, the system may provide a "radio" link, generate a song list associated with the user criteria and, as further permitted by the content data provided by the content provider, and play the songs in sequence for the user to hear. The system may further provide a link to the content provider, or the content identifier itself, in the home page of the user or a section of the web page being currently visited by the user.

Referring now to FIGS. 4a-4g, in an embodiment a user interface may include various web pages as described herein and through which the one or more users of the system may interact. The embodiment shown relates specifically to musical content, but it may be understood that the web pages may be adapted for any other digital content within the scope of the present disclosure.

Figure 4A:
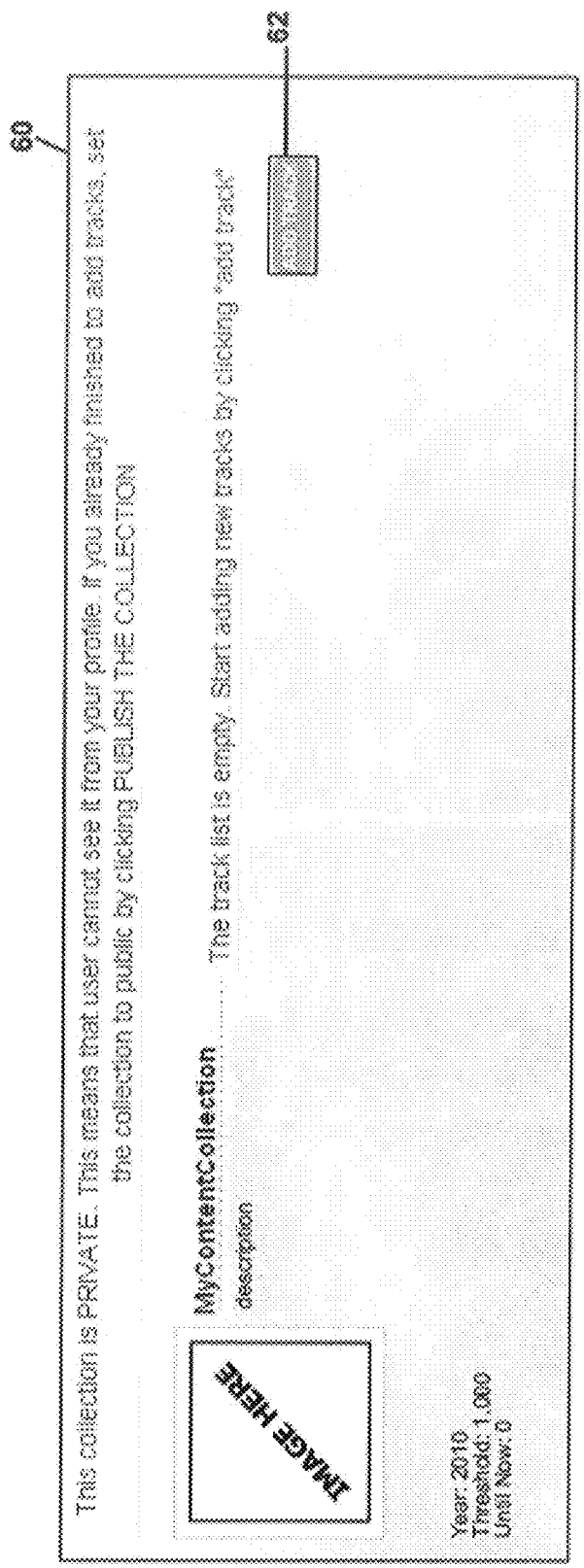
FIGS. 4*a* to 4*g* are modified screen shots showing various web pages in an exemplary embodiment of the user interface of the present disclosure.

FIG. 4a shows a first page 60 which may be displayed to a content provider upon first seeking to provide a new song or collection of songs to the profile of the content provider. A button 62 may be provided by the system to prompt the content provider to add digital content.

Figure 4B:
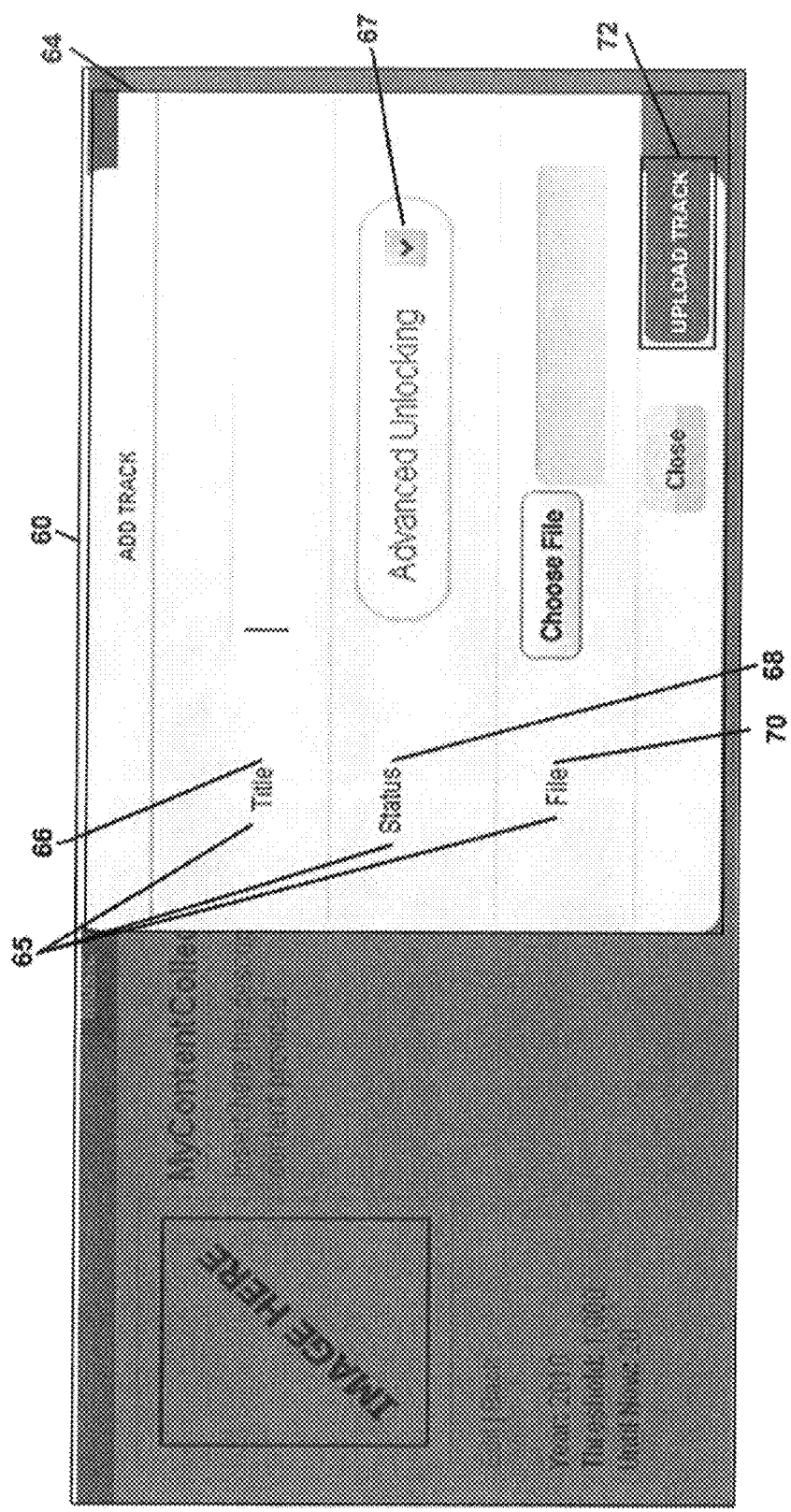

FIG. 4b shows a second page 64 or alternatively a pop-up box 64 superimposed over or within the first page 60 upon selection by a content provider of the button 62 in the first page 60. A content provider may then be prompted by the system to enter content data 65 including for example a content identifier 66 (e.g., song title), a pull-down menu 67 for selecting a content type 68 (e.g., status 68), a search link 70 wherein the digital content to be uploaded may be selected from the content provider computer by the content provider, and a button 72 provided by the system whereby the content provider may be prompted to transmit the content data to the system.

Figure 4C:
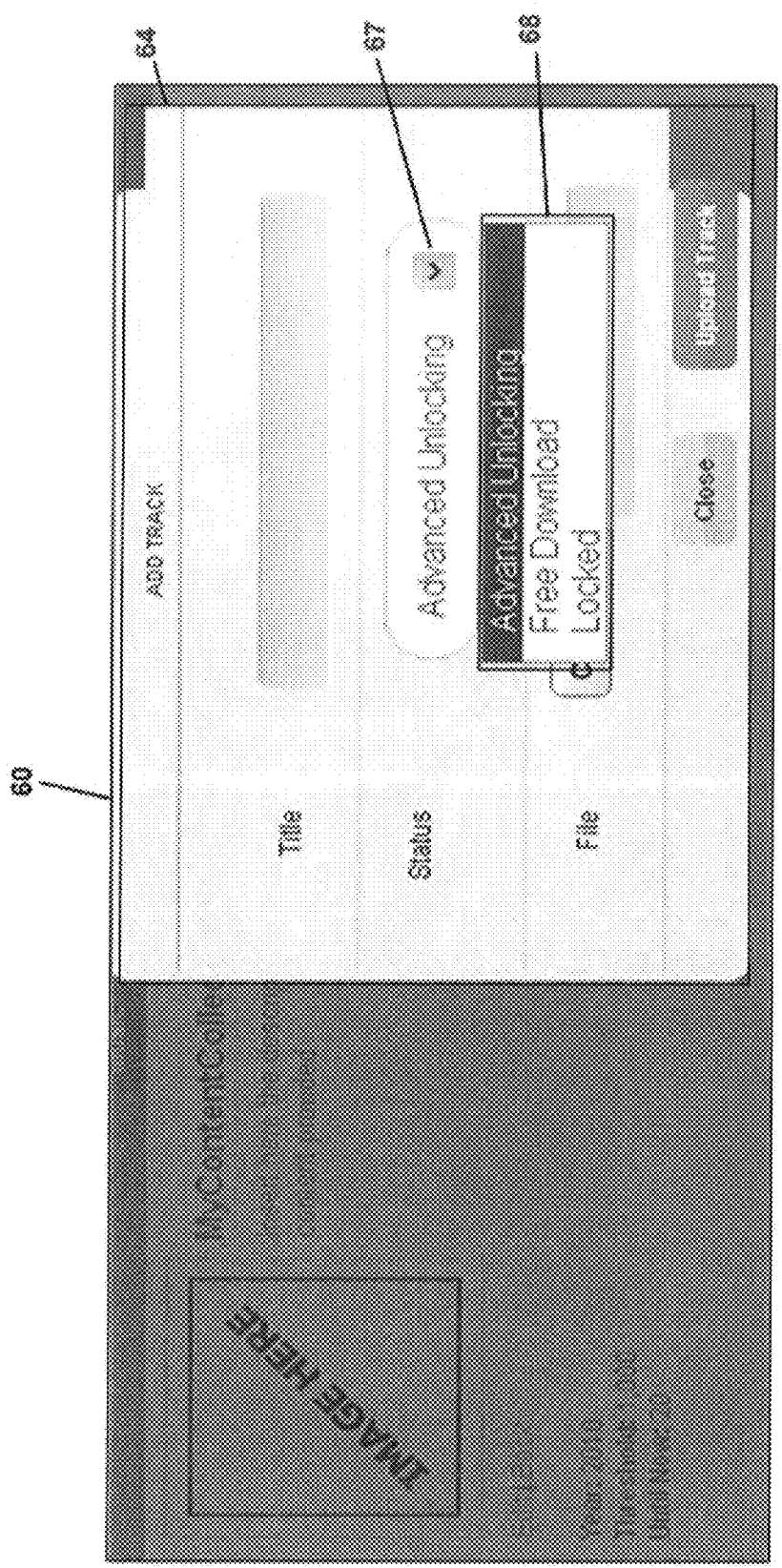

FIG. 4c shows the pull-down menu 67 of FIG. 4b when clicked by a content provider to select from a plurality of content types 68 to be associated with the content.

Figure 4D:
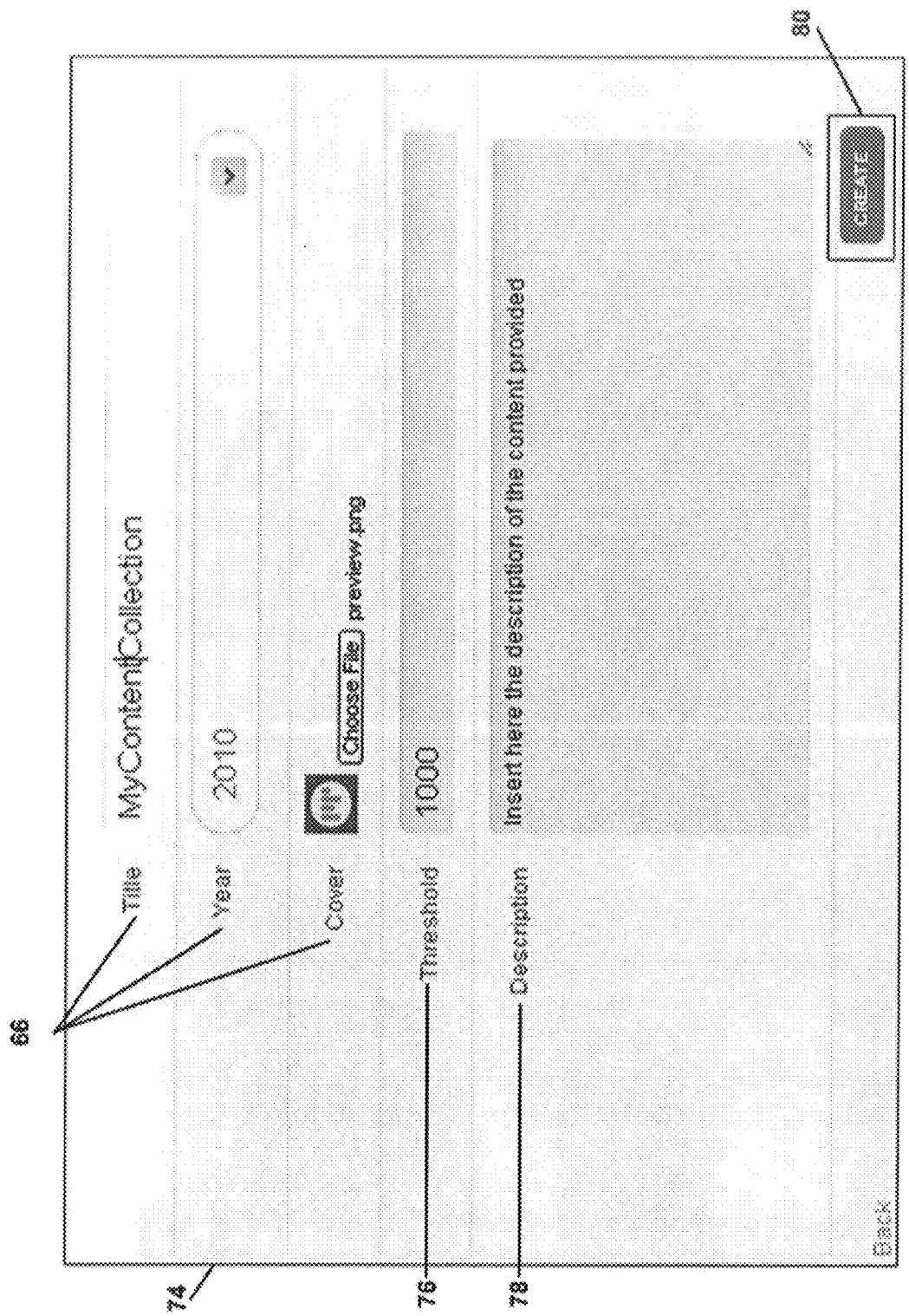

FIG. 4d shows a third page 74 wherein the content provider may provide content data associated with a collection of songs to be collectively released upon receiving a cumulative value from users in excess of a value threshold 76. In an embodiment as shown the content provider may be prompted by the system to enter various examples of content data 66 further including a value threshold 76 and a written description 78 of the associated content. A button 80 may be provided by the system such that the content provider may be prompted to transmit the associated content data 66, value threshold 76 and description 78 to the system.

Figure 4E:
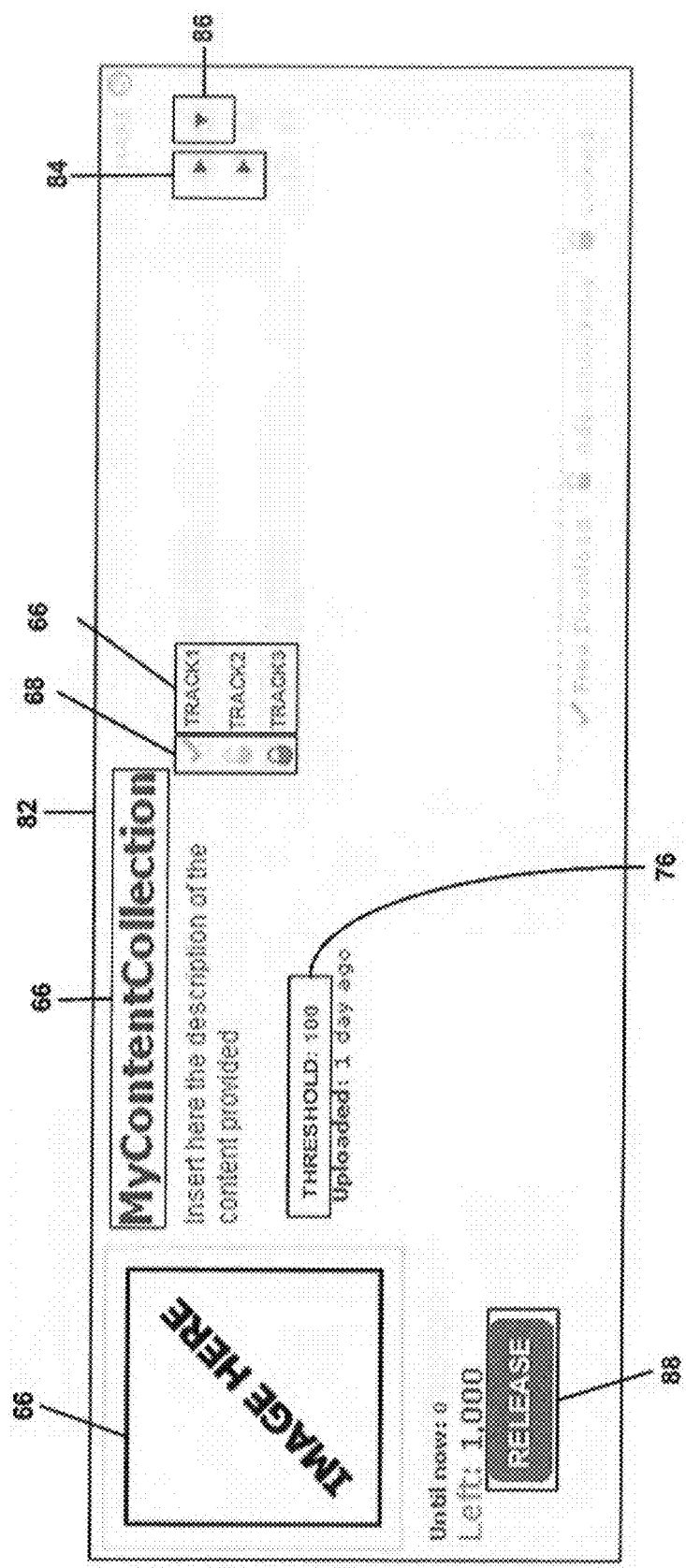

FIG. 4e shows a fourth page 82 associated with a song collection. The page is generally user-accessible and displays various content data associated with the digital content in the collection, including content identifiers 66, the value threshold 76, and content types 68 of the various songs. The content types 68 in this example are represented by symbols indicating free content, locked content, or a hybrid content type (such as in the example shown a form of hybrid type called "advanced unlocking" wherein contributing users may access the content even before the content is unlocked for access by all other users in response to a cumulative value exceeding the value threshold for the entire collection, and in certain embodiments may even have access to other content within a compilation or collection of content including the content to which the user has contributed). A first set of selectable buttons 84 may be provided by the system in association with each song in the collection that the user can currently play, based on for example the content type 68 and in various embodiments also the user status (based on criteria such as whether the user is an active contributor, etc.). A second set of selectable buttons 86 may further be provided by the system in association with each song in the collection that the user can currently download, also based on for example the content type 68 and in various embodiments also the user status (based on criteria such as whether the user is an active contributor, etc.). Another button 88 may be provided by the system such that the user may be prompted to upload value and thereby contribute toward the cumulative value associated with the collection.

Figure 4F:
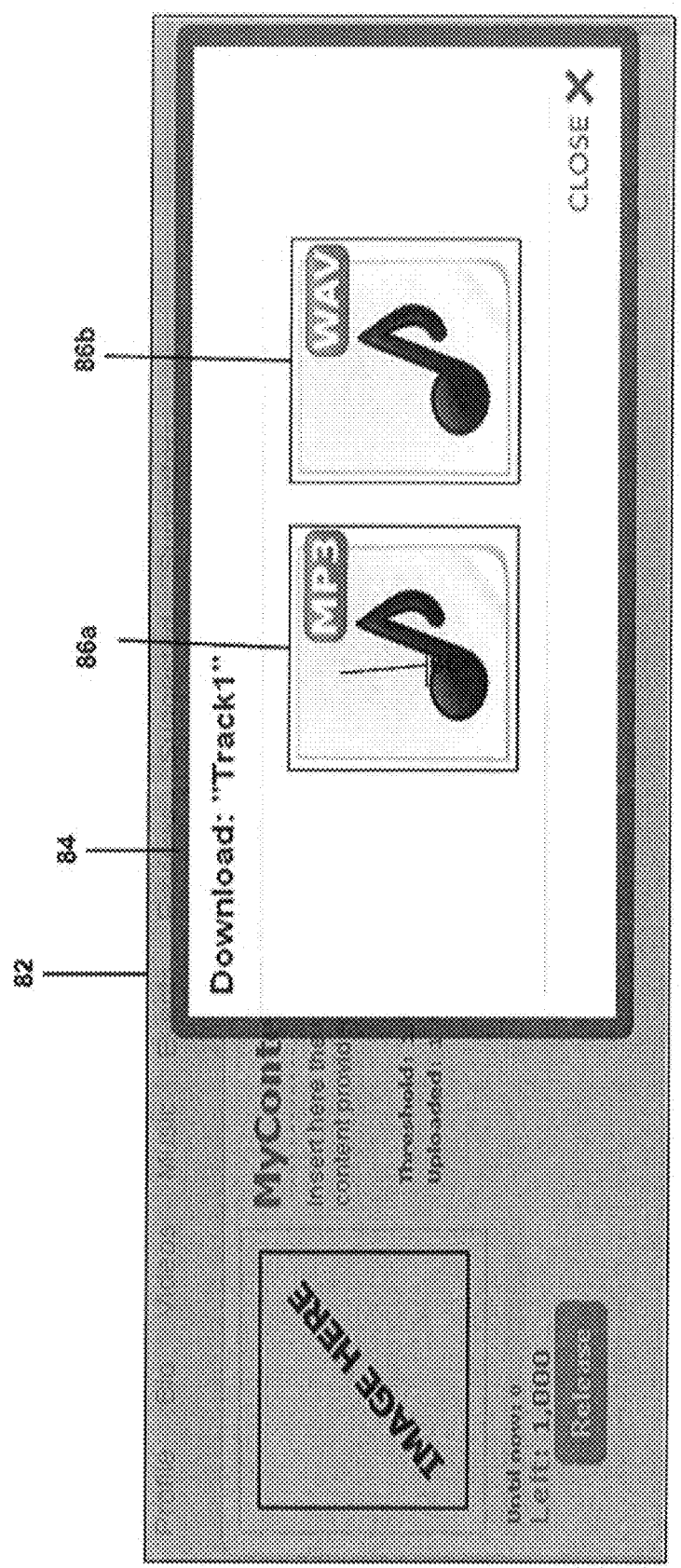

FIG. 4f shows a fifth page 84 or alternatively a pop-up box 84 superimposed over or within the fourth page 82 which the system may provide when the user elects to download a particular song from the collection, and wherein the user may select a digital content format 86 from among a plurality of available formats 86a, 86b.

Figure 4G:
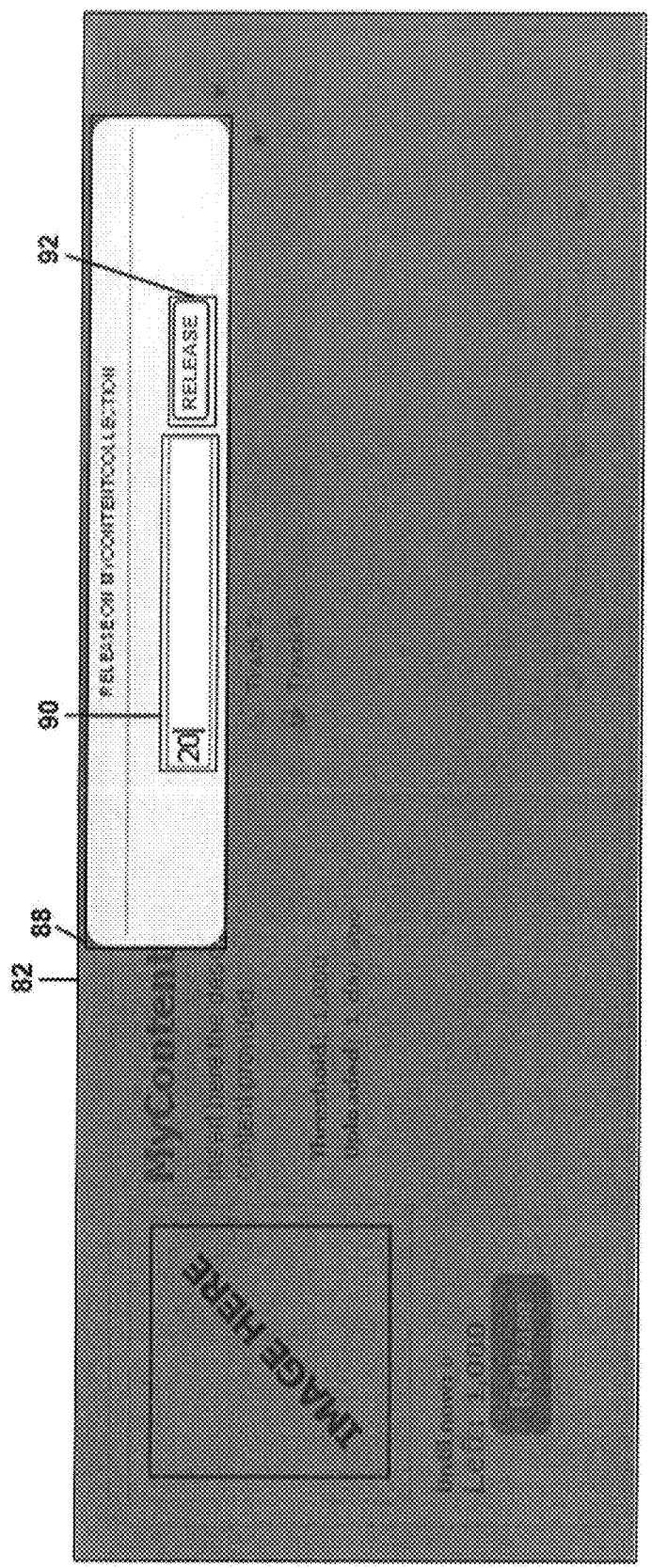

FIG. 4g shows a sixth page 88 or alternatively a pop-up box 88 superimposed over or within the fourth page 82 which the system may provide when the user elects to contribute value toward the release of the song collection. In various embodiments the user may be provided with a data entry box 90 with which to enter a value which is to be provided, and a button 92 with which to submit the entry. The system may further in certain embodiments provide another pop-up box wherein the user may conduct transactions to provide the value, either from a remote account wherein value is transmitted via the communications network or from a local user account where value is currently stored based on previous such value transactions. Where for example the value to be provided is an intangible value such as user information, another pop-up box may be generated and provided for that purpose as well.

Figure 2A:
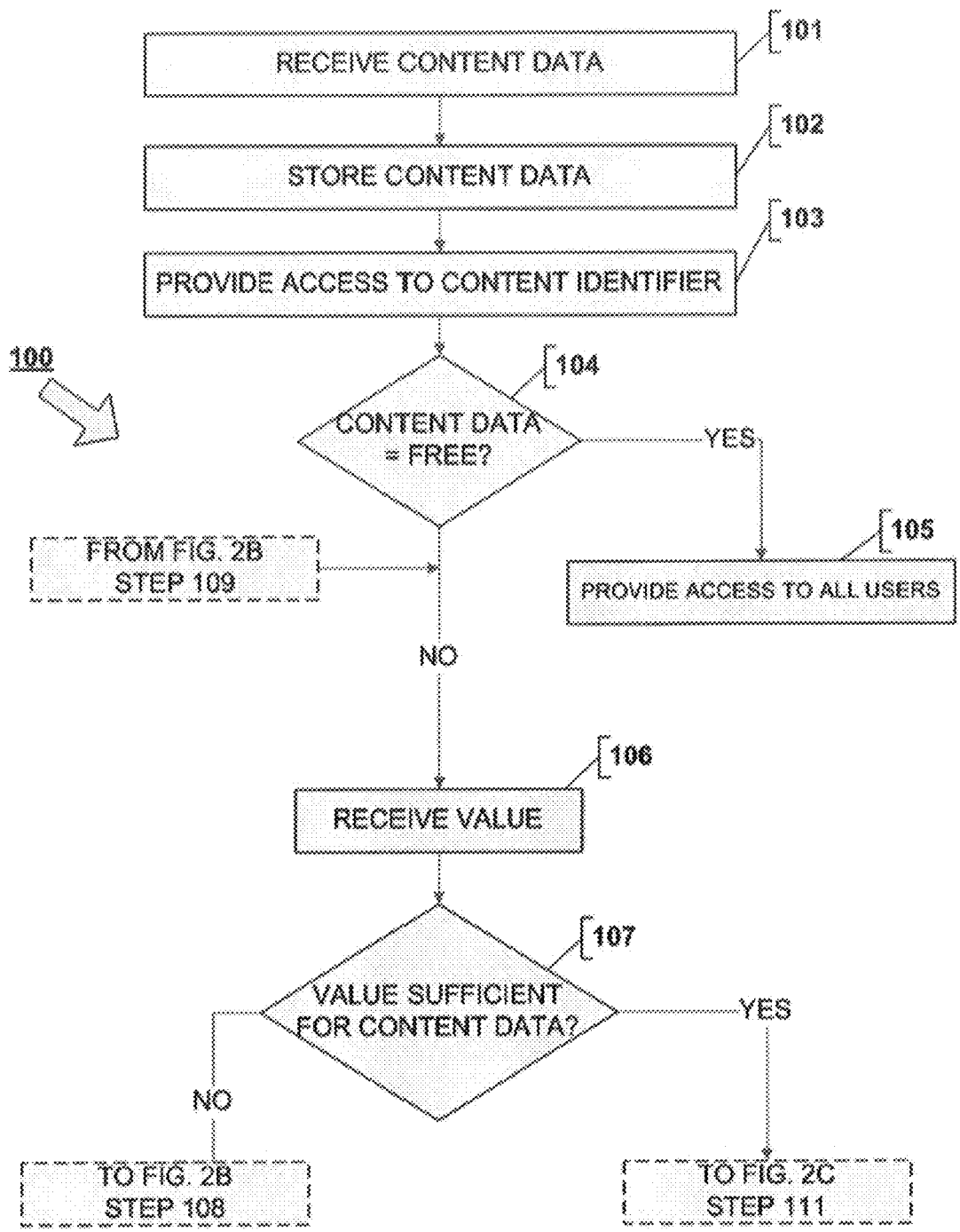
FIGS. 2*a* to 2*c* are flowcharts showing an example of a method for facilitating interaction according to an embodiment of the present disclosure.
Figure 2B:
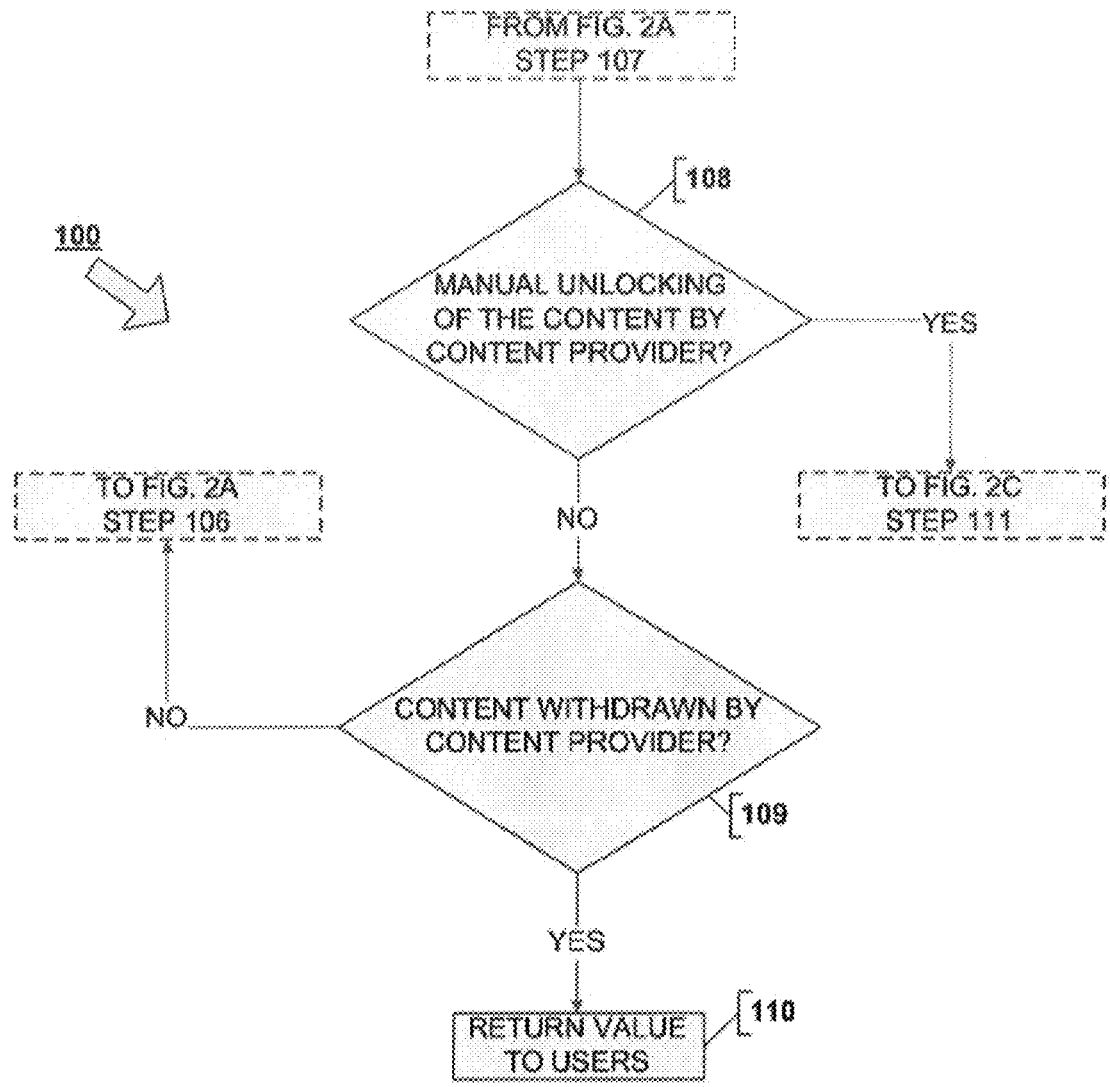
Figure 2C:
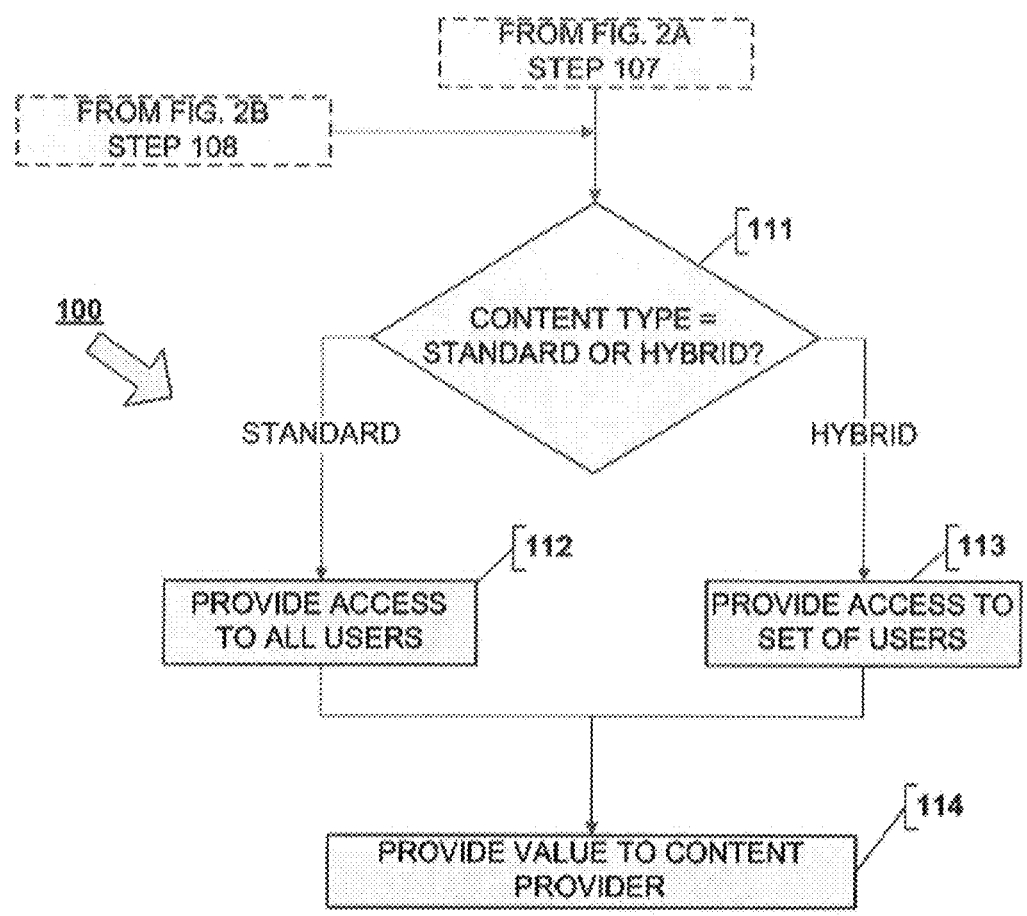
Figure 5A:
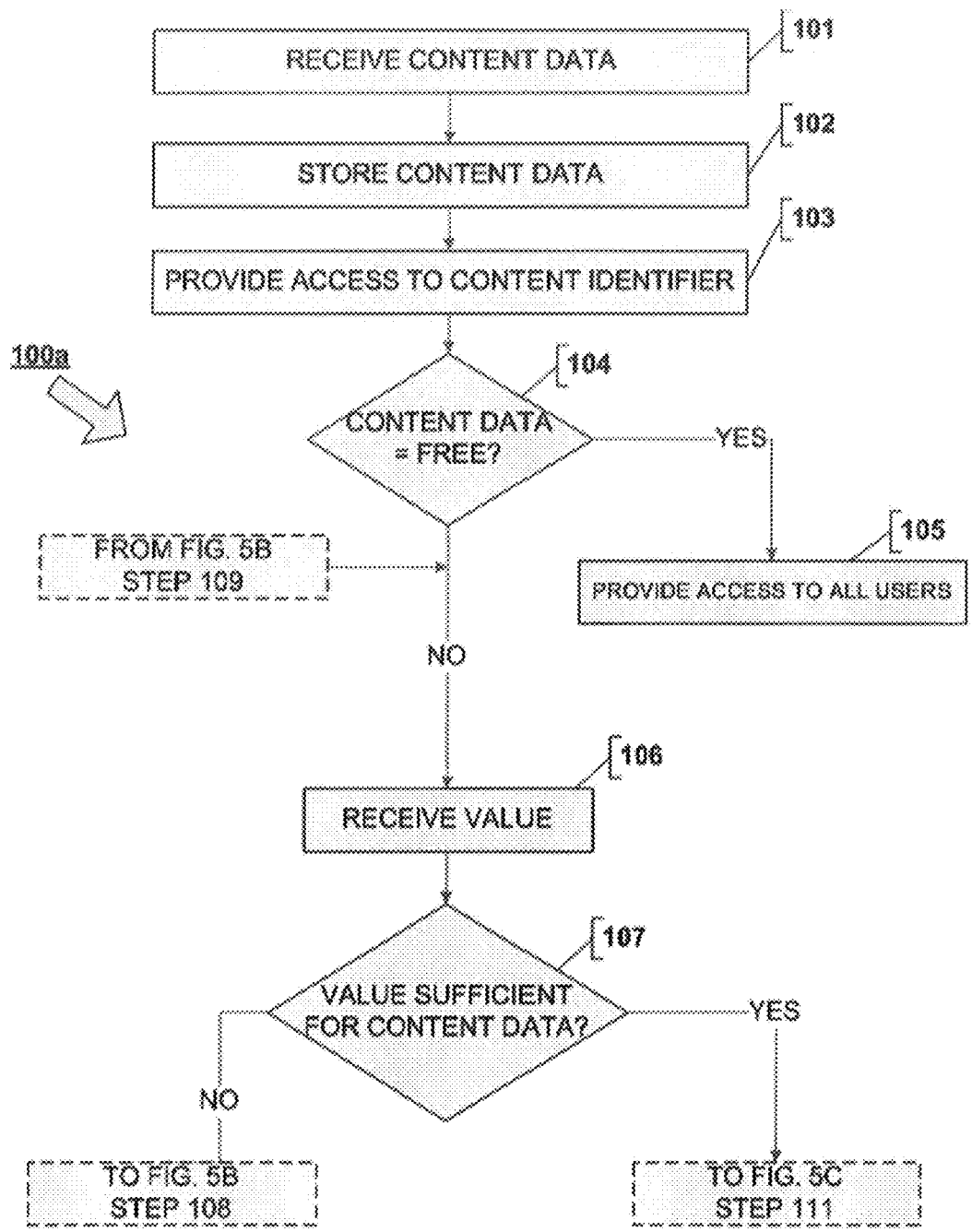
FIGS. 5*a* to 5*c* are flowcharts showing an alternative embodiment of the method of FIGS. 2*a*-2*c*.
Figure 5B:
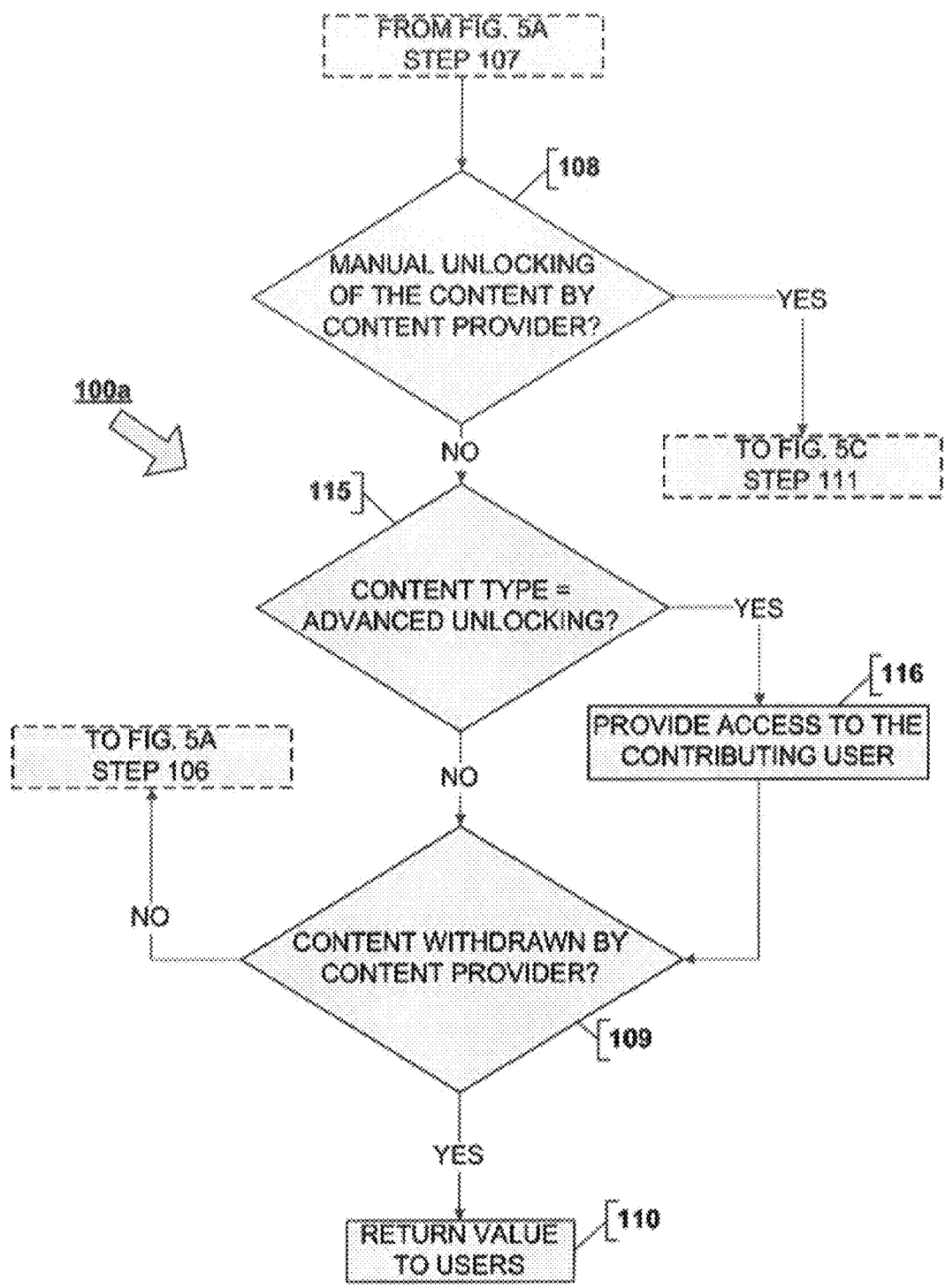
Figure 5C:
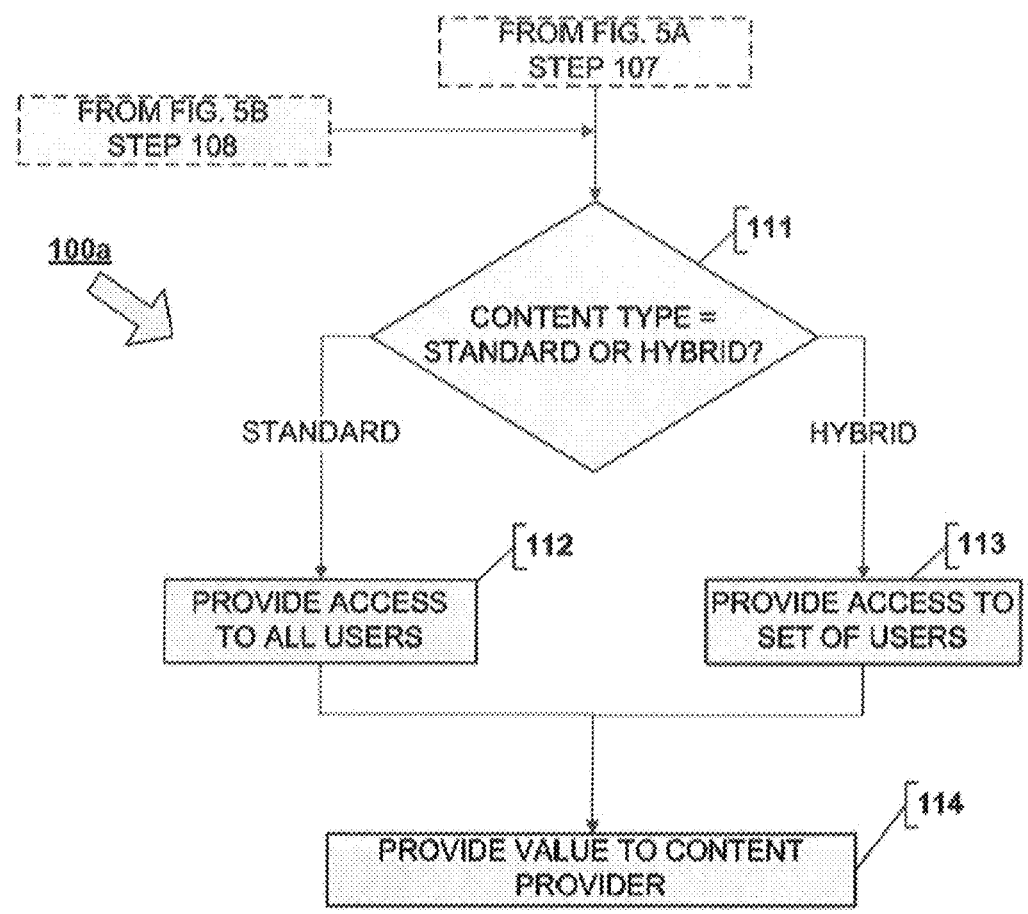

Referring generally now to FIGS. 5a-5c, in various embodiments an alternative method 100a to that described in FIGS. 2a-2c may be described within the scope of the present disclosure. The method 100a includes substantially the same steps 101-114 as described above, but may further perform steps 115-116 below.

When the cumulative value received from the one or more users is determined by the system to be insufficient with respect to the content data, or more particularly in various embodiments to the value threshold set by the content provider (e.g., "no" in response to the query of step 107), and the content provider has not manually unlocked the associated digital content (e.g., "no" in response to the query of step 108), the method 100a continues in step 115 by determining if the content type selected by the content provider is "premium unlocking" or alternatively stated "advanced unlocking."

"Premium unlocking" as described herein may relate to a content type wherein users that have contributed value with respect to a particular example of digital content may be provided access by the system to the content or alternatively some portion thereof (in step 116) even where the value threshold has not been exceeded. Users that have not contributed value will alternatively not be provided access. In various embodiments the system may assign a user status to each user of the system with respect to each example of digital content (for example "contributing" or non-contributing," wherein the system provides access to content that is "premium unlocked" for any user having a "contributing" status or the equivalent with respect to a given content. It may be understood of course that the user status will in various embodiments be irrelevant to content types such as "standard" or "free," where the content provider has locked or unlocked access to the content for all users irrespective of their contribution to date.

After access to premium unlocked content has been provided in step 116 to contributing users, the method continues to step 109 and determines if the content has been withdrawn by the content provider. If the content provider in fact withdraws the content prior to the cumulative received value being sufficient with respect to the content data, such as exceeding the value threshold, the collected value may be returned to the contributing users in step 110, even where the one or more contributing users previously had access to the content.

The previous detailed description has been provided for the purposes of illustration and description. Thus, although there have been described particular embodiments of the present invention of a new and useful "Web-based System and Method Facilitating Provider-User Interaction and the Releasing of Musical Content," it is not intended that such references be construed as limitations upon the scope of this invention except as set forth in the following claims.

What is claimed is:

1. A computer implemented method of compensating a content provider for the distribution of digital content, comprising:

receiving content data at a database, the content data transmitted from the content provider via a communications network and a customized graphical user interface, the content data comprising digital content, a content identifier and a value threshold;

providing access to the content identifier by users of the user interface;

receiving value from each of a plurality of users in association with the content identifier, said value of a type designated by the content provider in association with the value threshold;

generating value data corresponding to a cumulative amount of value received from the plurality of users in association with the content identifier;

determining whether access to the content is to be provided to one or more users, the determination based on a comparison of the value data corresponding to the cumulative amount of the value received and the value threshold; and distributing the cumulative amount of value received from the plurality of users to the content provider.

2. The method of claim 1, the content data further comprising a content access type associated with the digital content and selectable from a plurality of access types via the user interface.

3. The method of claim 2, wherein the plurality of selectable access types includes a standard content type, further wherein the content received from the content provider is restricted to all users via the user interface prior to a cumulative received value exceeding the value threshold, and the content received from the content provider is automatically made unrestricted to all users when the cumulative received value exceeds the value threshold.

4. The method of claim 3, wherein the plurality of selectable access types includes a free content type, wherein the content is accessible to users via the user interface prior to a cumulative received value exceeding the value threshold.

5. The method of claim 2, wherein the plurality of selectable access types includes a hybrid content type, wherein
the content received from the content provider is restricted to all users via the user interface prior to a cumulative received value exceeding the value threshold, and
the content received from the content provider is unrestricted to a set of one or more users via the user interface when the cumulative received value exceeds the value threshold.

6. The method of claim 5, wherein the content is unrestricted only to a set of one or more users determined to have provided value in association with the content.

7. The method of claim 2, wherein the plurality of selectable access types includes a premium unlocked content type, wherein
the content received from the content provider is unrestricted only to users that have contributed value with respect to the content via the user interface prior to a cumulative received value exceeding the value threshold, and
the content is unrestricted to all users via the user interface when the cumulative received value exceeds the value threshold.

8. The method of claim 1, further comprising the steps of:
establishing an account associated with the content provider, the content received from the content provider being stored in the account, and
providing access to the account by the content provider wherein the content data associated with content may be provided, selected or revised by the content provider.

9. A non-transitory computer-readable storage medium having instructions residing thereon, the instructions executable by one or more processors to cause the one or more processors to further perform the steps of:
receiving content data at a database, the content data transmitted from a content provider via a communications network and a customized graphical user interface, the content data comprising digital content, a content identifier and a value threshold;
providing access to the content identifier by users of the user interface;
receiving value from a plurality of users in association with the content identifier, said value of a type designated by the content provider in association with the value threshold;
generating value data corresponding to a cumulative amount of value received from the plurality of users in association with the content identifier;
determining whether access to the content is to be provided to one or more users, the determination based on a comparison of the value data corresponding to the cumulative amount of value received and the value threshold; and
distributing the cumulative amount of value received from the plurality of users to the content provider.

10. The computer-readable storage medium of claim 9, wherein the content data further comprises a content access type selectable by the content provider from a plurality of access types via the user interface.

11. The computer-readable storage medium of claim 10, wherein the plurality of selectable access types includes a standard content type, further wherein
the content is restricted to all users via the user interface prior to a cumulative received value exceeding the value threshold, and
the content is unrestricted to all users when a cumulative received value exceeds the value threshold.

12. The computer-readable storage medium of claim 11, wherein the plurality of selectable access types includes a free content type, wherein
the content is unrestricted to users via the user interface prior to a cumulative received value exceeding the value threshold.

13. The computer-readable storage medium of claim 10, wherein the plurality of selectable access types includes a hybrid content type, wherein
the content received from the content provider is restricted to all users via the user interface prior to a cumulative received value exceeding the value threshold, and
the content received from the content provider is unrestricted to a set of one or more users via the user interface when a cumulative received value exceeds the value threshold.

14. The computer-readable storage medium of claim 13, wherein the content received from the content provider is unrestricted only to a set of one or more users determined to have provided value in association with the content.

15. The computer-readable storage medium of claim 10, wherein the plurality of selectable access types includes a premium unlocked content type, wherein
the content is unrestricted only to users that have contributed value with respect to the content via the user interface prior to a cumulative received value exceeding the value threshold, and
the content is unrestricted to all users via the user interface when the cumulative received value exceeds the value threshold.

16. The computer-readable storage medium of claim 9, further comprising the steps of:
establishing an account associated with the content provider, the content received from the content provider being stored in the account, and
providing access to the account by the content provider wherein the content data associated with content may be provided, selected or revised by the content provider.

17. The computer-readable storage medium of claim 9, the customized graphical user interface further comprising a web site having a plurality of individually customized web pages, wherein user access to content may be provided via one or more of the customized web pages.

18. A computer implemented method of selectively providing access to online content via a customized graphical user interface, the method comprising:
enabling a content provider to define a value threshold in association with online content;
receiving value from a plurality of contributing users in association with the content, said value of a type designated by the content provider in association with the value threshold;
generating value data corresponding to a cumulative amount of value associated with the content;
determining access to the content for a particular user of the plurality of users based on value received from the particular user, a cumulative value received from the plurality of contributing users, and the predetermined value threshold; and
distributing the cumulative amount of value received from the plurality of users to the content provider.

19. The method of claim 18, the content criteria comprising a rule wherein all users are provided access to the content when the cumulative value is received in excess of the predetermined value threshold.

20. The method of claim 18, the content criteria comprising a rule wherein only users from whom value is received are provided access to the content prior to the cumulative value being received in excess of the predetermined value threshold.

* * * * *